United States Patent
Jiang et al.

(10) Patent No.: US 10,069,942 B2
(45) Date of Patent: Sep. 4, 2018

(54) METHOD AND APPARATUS FOR CHANGING CONFIGURATIONS

(71) Applicant: Alibaba Group Holding Limited, George Town, Grand Cayman (KY)

(72) Inventors: Bangjie Jiang, Hangzhou (CN); Chenghao Suan, Hangzhou (CN); Shunmin Zhu, Hangzhou (CN); Han Xiao, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 262 days.

(21) Appl. No.: 15/018,003

(22) Filed: Feb. 8, 2016

(65) Prior Publication Data

US 2016/0241441 A1  Aug. 18, 2016

(30) Foreign Application Priority Data

Feb. 13, 2015  (CN) .......................... 2015 1 0079495

(51) Int. Cl.
*H04L 12/24* (2006.01)
*H04L 29/06* (2006.01)
*H04L 12/26* (2006.01)

(52) U.S. Cl.
CPC .......... *H04L 67/42* (2013.01); *H04L 41/0813* (2013.01); *H04L 41/0859* (2013.01); *H04L 41/0873* (2013.01); *H04L 43/10* (2013.01)

(58) Field of Classification Search
CPC ............. H04L 41/0813; H04L 41/0859; H04L 41/873; H04L 43/10; H04L 67/42
See application file for complete search history.

(56) References Cited

U.S. PATENT DOCUMENTS

| | | | |
|---|---|---|---|
| 5,491,791 A | 2/1996 | Glowny et al. |
| 5,561,769 A | 10/1996 | Kumar et al. |
| 5,835,694 A | 11/1998 | Hodges |
| 5,870,719 A | 2/1999 | Maritzen et al. |
| 6,144,992 A | 11/2000 | Turpin et al. |
| 6,246,678 B1 | 6/2001 | Erb et al. |
| 6,650,749 B1 | 11/2003 | Laulo |
| 6,748,436 B1 | 6/2004 | Anand et al. |
| 6,826,581 B2 | 11/2004 | Moslander et al. |

(Continued)

*Primary Examiner* — Alina A Boutah

(57) ABSTRACT

Embodiments of the present invention provide a method for changing configurations at a client device is presented. The configuration changing method comprises: a) sending a heartbeat request message to a network device over a network, wherein the heartbeat request message carries a current first configuration change code of a client device; b) receiving from the network device a heartbeat response message in accordance with the first configuration change code, wherein the heartbeat response message carries a current second configuration change code of the network device; c) sending, in accordance with the first configuration change code and the second configuration change code, a request message to the network device for synchronizing configurations; d) obtaining configuration synchronization information sent from the network, synchronizing configurations of associated services according to the configuration synchronization information, and updating the first configuration change code in accordance with the results of the configuration synchronization.

20 Claims, 9 Drawing Sheets

(56) References Cited

U.S. PATENT DOCUMENTS

| | | |
|---|---|---|
| 6,917,628 B2 | 7/2005 | McKinnin, III et al. |
| 7,058,702 B2 | 1/2006 | Hogan |
| 7,171,442 B1 | 1/2007 | Huang |
| 7,206,824 B2 | 4/2007 | Somashekar et al. |
| 7,318,101 B2 | 1/2008 | Droms |
| 7,353,259 B1 | 4/2008 | Bakke et al. |
| 7,395,324 B1 | 7/2008 | Murphy et al. |
| 7,451,359 B1* | 11/2008 | Coekaerts ........... G06F 11/0709 709/223 |
| 7,478,124 B2 | 1/2009 | Huang |
| 7,529,816 B2 | 5/2009 | Hayden et al. |
| 7,155,514 B1 | 12/2009 | Milford |
| 7,917,613 B2* | 3/2011 | Letca ..................... H04L 43/10 709/223 |
| 8,078,712 B2 | 12/2011 | Dehaan et al. |
| 8,189,612 B2 | 5/2012 | Lemaire et al. |
| 8,529,815 B2 | 9/2013 | Carlsson |
| 8,725,863 B2 | 5/2014 | Chiu et al. |
| 8,972,533 B1 | 3/2015 | Roka |
| 9,002,997 B2 | 4/2015 | Kowalski et al. |
| 9,042,266 B2 | 5/2015 | Livingston |
| 9,117,164 B2 | 8/2015 | Park |
| 9,219,976 B2 | 12/2015 | Isobe et al. |
| 2005/0015471 A1* | 1/2005 | Zhang ................ H04L 63/0442 709/221 |
| 2007/0156842 A1* | 7/2007 | Vermeulen ........ G06F 17/30212 709/217 |
| 2008/0209194 A1 | 8/2008 | Prabakaran et al. |
| 2009/0064192 A1* | 3/2009 | Betts ................... H04L 41/0853 719/318 |
| 2010/0131630 A1 | 5/2010 | Kondamuru et al. |
| 2010/0131633 A1 | 5/2010 | Herlein et al. |
| 2011/0093516 A1* | 4/2011 | Geng ...................... G06F 8/65 707/827 |
| 2012/0032945 A1 | 2/2012 | Dare et al. |
| 2012/0044955 A1* | 2/2012 | Chandrasekaran ......................... H04L 41/0896 370/468 |
| 2012/0166391 A1* | 6/2012 | Liu ..................... H04L 65/4076 707/622 |
| 2012/0246113 A1 | 9/2012 | Chen |
| 2013/0054682 A1* | 2/2013 | Malik ................... H04W 4/001 709/203 |
| 2015/0081892 A1* | 3/2015 | Park ....................... H04L 43/10 709/224 |
| 2016/0165463 A1* | 6/2016 | Zhang .................... H04L 43/10 370/218 |

* cited by examiner

METHOD AND APPARATUS FOR CHANGING CONFIGURATIONS

CROSS-REFERENCE TO RELATED APPLICATION

This application claims priority to Chinese Patent Application No. 201510079495.6, filed on Feb. 13, 2015, which is incorporated herein by reference in its entirety.

TECHNICAL FIELD

Embodiments according to the present disclosure relate generally to communication and computer technologies and, more particularly, to a method and apparatus for changing configurations.

BACKGROUND

The client-server model of computing is a distributed application structure that partitions tasks or workloads between the providers of a resource or service, often called servers, and service requesters, often called clients. Generally, clients and servers communicate over a computer network on separate hardware, but both the client and the server may reside in the same system. A server host runs one or more server programs that share their resources with clients. Systems constructed with clients and servers enjoy widespread application on the Internet. One or more clients may interact with the server-side by connecting to it in order to obtain services to satisfy the clients' needs. A client frequently needs to synchronize its configuration with a server. When a configuration changes, the client needs to be notified in some way to update its configuration. However, complicated configuration changes and large numbers of clients (sharing a same server) usually make the required configuration updates, notifications, and synchronizations much more complicated, especially for a lightweight cluster architecture system, where adding a special configuration synchronizing module will unequivocally increase server-side burdens and workloads.

Conventionally, the following solutions have been used to solve the issue of configuration synchronization:

1. Set a configuration synchronizing module at the client to periodically send join queries. The client in this solution requires separate installation of a configuration synchronizing module, and when there are a large number of clients, additional burdens from processing new connections will be disadvantageously added to the server.

2. A server proactively pushes configuration information. In this solution, when the configuration associated with a client changes, the server proactively pushes configuration information to the client-side. The server-side in this solution requires the installation of an additional module for maintaining clients' information that is registered in the system.

3. A client and a server maintain a long transmission control protocol (TCP) connection. This solution is actually a variant of solution 2 above, where a list of clients registered in the system needs to be maintained. However, a long TCP connection itself is not reliable because the long connection can be interrupted by timeouts generated by intermediate equipment on the network.

4. Use a separate controller to issue configuration changes to the clients. This solution is also a variant of Solution 2 that pushes information to the clients, and in which a list of clients who have registered to the system needs to be maintained. Maintaining the separate controller is also required, which is not suitable for a lightweight cluster architecture system. Moreover, once the controller crashes, the whole system unfortunately crashes.

Therefore, all of the solutions discussed in the foregoing are focused on how to implement synchronization of the configurations. Maintaining an associated module is required regardless of whether the mechanism is querying or pushing modes. When a series of certain services needs to be synchronized with multiple clients, changes in the configurations may make the notifications of such changes and synchronizations even more complicated. Hence, a united method to process different changes in configurations is required.

SUMMARY OF INVENTION

An object of the present disclosure is to provide a method and apparatus for synchronizing configurations rapidly without adding or maintaining additional maintaining modules at the client or server sides. In view of this, the embodiments of the present invention provide a client-device-end-configuration-change method wherein the configuration change method comprises: a) sending a heartbeat request message to a network device over a network, wherein the heartbeat request message carries a current first configuration change code of a client device; b) receiving from the network device a heartbeat response message in accordance with the first configuration change code, wherein the heartbeat response message carries a current second configuration change code of the network device; c) sending, in accordance with the first configuration change code and the second configuration change code, a request message to the network device for synchronizing configurations; and d) obtaining configuration synchronization information sent from the network, synchronizing configurations of associated services according to the configuration synchronization information, and updating the first configuration change code in accordance with the results of the configuration synchronization.

In one embodiment, the present invention provides a client-device-end-configuration-change method wherein the configuration change method comprises the following: a) sending a heartbeat request message to network equipment, wherein the heartbeat request message carries a current first configuration change code of the client device; b) obtaining a heartbeat response message sent back by the network equipment in accordance with the first configuration change code, the heartbeat response message carrying a current second configuration change code of the network equipment; c) in accordance with the first and second configuration change codes, sending a configuration synchronizing request message to the network equipment; and d) obtaining configuration synchronization information sent back by the network equipment in order to perform configuration synchronization of relevant services. The method also comprises updating the first configuration change code in accordance with the results of the configuration synchronization. Additionally, the configuration code of the current second configuration change code carried by the heartbeat response message is identical to the configuration code of the first configuration change code.

Preferably, sending the configuration synchronizing request message to the network equipment in accordance with the first configuration change code and the second configuration change code comprises the following: a) when the configuration version of the first configuration change code of the client device is "uncreated," sending a configuration creation request for relevant services to the network equipment; b) when the configuration version of the second configuration change code is newer than the configuration version of the first configuration change code, sending a request for configuration updating for relevant services to the network equipment; c) when the configuration version of the second configuration change code is "to be deleted," sending a configuration deletion request for relevant services to the network equipment; or d) when a timestamp of the configuration version of the first configuration change code of the client device is different than a timestamp of the configuration version of the second configuration change code, sending a request for configuration reconstruction for relevant services to the network equipment.

Obtaining the configuration synchronization information sent back by the network equipment comprises obtaining a configuration synchronizing response message sent back by the network equipment, the configuration synchronizing response message carrying configuration information for relevant services.

The configuration information for relevant services carried by the configuration synchronizing response message comprises one of the following information: configuration information for the creation of services configuration, configuration information for the updating of services configuration, configuration information for the deletion of services configuration, or configuration information for the reconstruction of services configuration.

Updating the first configuration change code in accordance with the results of configuration synchronization comprises the following: a) after performing the creation of services configuration, creation of a configuration version and timestamp of the first configuration change code; b) after updating the services configuration, updating the configuration version of the first configuration change code; c) after deleting the services configuration, designating the configuration version of the first configuration change code as "to be deleted;" or, d) after reconstructing the services configuration, updating the timestamp of the first configuration change code.

Additionally, the configuration code of the first configuration change code or the second configuration change code comprises a cyclic redundancy code obtained in accordance with a services name of the relevant configurations. The configuration version of the configuration code of the first or second configuration change code comprises version information for the relevant services configuration. The timestamp of the configuration code of the first or second configuration change code comprises the time of configuration creation for the relevant services configuration.

The embodiments of the present invention provide a configuration change method for a network equipment end, wherein the configuration change method comprises the following: a) obtaining a heartbeat request message sent by a client device, the heartbeat request message carrying a current first configuration change code of the client device; b) searching for a current second configuration change code of the client device for relevant services in accordance with the first configuration change code; c) sending a heartbeat response message back to the client device, the heartbeat response message carrying the second configuration change code; d) obtaining the heartbeat response message and, in accordance with a configuration synchronization message sent by the client device, sending back configuration synchronization information.

After the client device sends back the heartbeat response message, the configuration change method further comprises the following: when the configuration version of the first configuration change code is larger (or more recent) than the configuration version of the current second configuration change code of the network equipment, performing configuration synchronization for relevant services at the network equipment end.

Searching for a current second configuration change code of the client device for relevant services in accordance with the first configuration change code comprises obtaining, in accordance with the configuration code of the current first configuration change code of the client device, a current second configuration code of the network equipment having an identical configuration code.

Additionally, the configuration synchronization information comprises a configuration synchronizing response message, the configuration synchronizing response message carrying configuration information for relevant services.

Additionally, the configuration code comprises a cyclic redundancy code obtained in accordance with a services name of relevant configurations. The configuration version comprises version information of the relevant services configuration, and the timestamp comprises the configuration creation time for the relevant services configuration.

The embodiments of the present invention provide a client device for changing configuration, wherein the client device comprises the following: a) a first component or "apparatus" configured for sending a heartbeat request message to a network device, wherein the heartbeat request message carries a current first configuration change code of the client device; b) a third component configured for obtaining a heartbeat response message sent from the network device in accordance with the first configuration change code, wherein the heartbeat response message comprises a current second configuration change code; c) a fifth component configured for sending a configuration synchronizing request message to the network device in accordance with the first and second configuration change codes; d) and a seventh component configured for obtaining configuration synchronization information sent from the network device to synchronize a configuration of the associated service and for updating the first configuration change code in accordance with the results of the configuration synchronization.

Additionally, the configuration code of the current second configuration code of the network device carried by the heartbeat response message is identical to the configuration code of the first configuration change code.

The fifth component comprises a first module configured for the following: a) sending a request to create a configuration for the associated service to the network device when a configuration version of the first configuration change code of the client device is marked as uncreated; b) sending a request to update a configuration for the associated service to the network device when a configuration version of the second configuration change code is marked as updated in comparison to the configuration version of the first configuration change code of the client device; c) sending a request to delete a configuration of the associated service to the network device when a configuration version of the second configuration change code is marked as awaiting to be deleted; or d) sending a request to reconstruct a configuration of the associated service to the network device when a timestamp of the configuration version of the first configuration change code of the client device is different from the timestamp of the second configuration change code.

The seventh component comprises a second module configured for obtaining a configuration synchronizing response message sent from the network device, wherein the configuration synchronizing response message comprises configuration information of the associated service.

The seventh component further comprises a third module configured for the following: a) generating a configuration version and a timestamp of the first configuration change code after an associated service is generated; b) updating the configuration version of the first configuration change code after the associated service is updated; c) labeling the configuration version of the first configuration change code as deleted after the associated service is deleted; or d) updating the timestamp of the first configuration change code after the associated service is reconstructed.

Additionally, the configuration code comprises a cyclic redundancy code obtained in accordance with the services name of the relevant configurations. The configuration version comprises version information of the relevant services configuration, and the timestamp comprises the configuration creation time for the relevant services configuration.

Embodiments of the present invention provide a network device for configuration changing, wherein the network device comprises the following: a) a second component configured for obtaining a heartbeat request message sent from a client device, wherein the heartbeat request message comprises a current first configuration change code of the client device; b) a fourth component configured for searching for a current second configuration code of the network device in accordance with the first configuration change code; c) a sixth component configured for sending to the client device a heartbeat response message, wherein the heartbeat response message comprises the second configuration change code; and d) an eighth component configured for obtaining a configuration synchronizing request sent from the client device and then sending configuration synchronization information in accordance with the configuration synchronizing request. The network device further comprises a tenth component configured for synchronizing a configuration of the associated service when a configuration version of the first configuration change code is greater than the configuration version of the current second configuration change code of the network device.

The fourth component comprises a fourth module configured for obtaining the second present configuration change code of the network device having an identical configuration code to the configuration code of first configuration change code in accordance with a configuration code of the current first configuration change code of the client device.

Additionally, the configuration synchronizing information comprises a configuration synchronizing message which carries configuration information for relevant services.

Additionally, the configuration code of the first or second configuration change code comprises a cyclic redundancy code obtained in accordance with the services name of the relevant configurations. The configuration version comprises version information of a relevant services configuration, and the timestamp comprises a configuration creation time for the relevant services configuration.

An embodiment of the present disclosure provides a system for changing configurations, wherein the system comprises the above-described client device and network device.

Compared to conventional techniques, a means of communicating through heartbeat messages is introduced in the present disclosure. A client device used for synchronizing configurations in the present disclosure uses a heartbeat request message that carries a present first configuration change code of a local service to obtain a present second configuration change code of the network device associated with the same local service. The client device detects differences between the first configuration change code and the second configuration change code to determine that information needs an update, where the second configuration change code is carried by a heartbeat response message sent from a network device. The client device then synchronizes and updates, by sending a configuration synchronizing request to synchronize the associated service to the network device, the related configurations and the first configuration change code respectively. A majority of client sides have integrated the mechanism of sending and receiving heartbeat messages, including heartbeat request messages and heartbeat response messages, in signal processing; therefore, there is no need to add additional modules that require maintenance, thereby reducing the burdens of both the client device and the network device. Moreover, the network device does not require the provision of additional modules to maintain clients' statuses, thereby reducing workload demands on the server. In accordance with embodiments of the present invention, a relatively lesser amount of data needs to be introduced when using the configuration change codes to cover all of the configuration change matters, which is beneficial for lightweight cluster architecture systems.

BRIEF DESCRIPTION OF THE DRAWINGS

Embodiments of the present disclosure will be better understood from a reading of the following detailed description, taken in conjunction with the accompanying figures, in which like reference characters designate like elements and in which.

DETAILED DESCRIPTION

Figure 1:
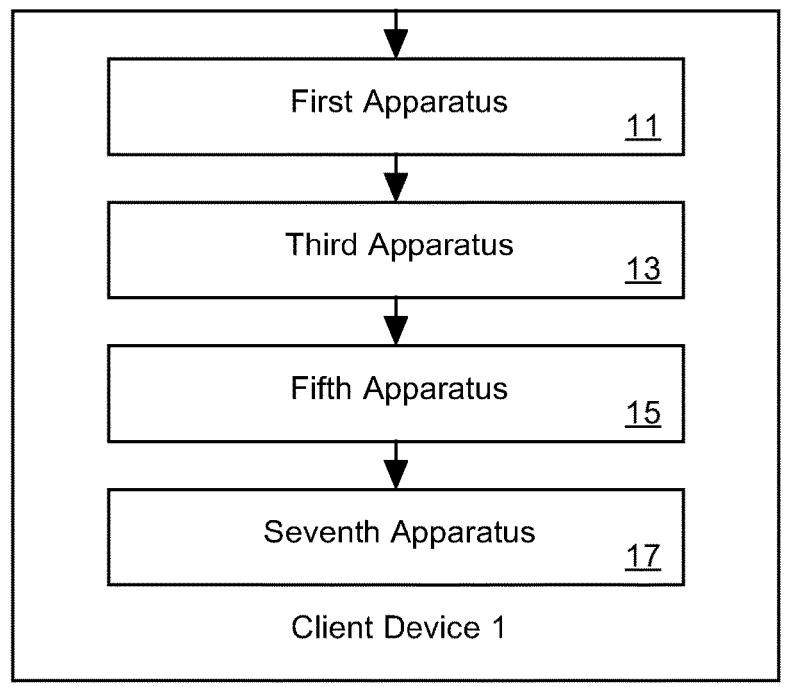
FIG. 1 illustrates a block diagram of a device for changing configurations according to an embodiment of the present disclosure.

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention In an embodiment of the present disclosure, a terminal, a device-serving network, and a trusted party all include one or multiple CPUs ("processors"), input/output ports, network ports, and memories. Memories can include computer-readable mediums such as a volatile memory, a random-access-memory (RAM), and/or a non-volatile memory, e.g. read-only-memory (ROM) or a flash RAM. A memory is an example of computer-readable medium. Computer-readable mediums include volatile, non-volatile, portable, and non-portable mediums. They can be used in any method or technique to implement information storage. The information can be computer-readable commands, data structures, program modules, or other data. The readable mediums disclosed include, but are not limited to, phase-change memory (PRAM), static random-access memory (SRAM), dynamic random-access memory (DRAM), other types of the random-access memory (RAM), read-only memory (ROM), electrically erasable programmable read-only memory (EEPROM), flash RAM and other memory technologies, compact disc read-only memory (CD-ROM), digital video disc (DVD) and other optical storage, magnetic tape, magnetic disc and other magnetic storage, and any other non-transition media. According to the present disclosure, computer-readable mediums do not include transitory media, such as the modulate data signal and carrier.

One object of an embodiment of the present disclosure is that using a heartbeat message to issue notifications of configuration changes to multiple client sides and/or client devices and server sides and/or network devices while minimizing configuration modules and configuration controllers to implement the synchronizations of the configurations. Meanwhile, the present disclosure introduces the concept of configuration change codes where variants of such codes represent variant changing situations to cover substantially all of the possible situations in which configuration changes occur. In particular, the concept of configuration change codes involves reusing the heartbeat message between the clients and the servers and providing the notifications of configuration changes between the client sides and the server sides by embedding configuration change codes in the heartbeat message.

FIG. 1 illustrates a block diagram of a device for changing configurations according to an embodiment of the present disclosure. Client device 1 includes first apparatus (or component) 11, third apparatus 13, fifth apparatus 15, and seventh apparatus 17. Client device 1 can be any kind of electrical product that interacts with users through a keyboard, a mouse, a touch pad, a touch screen, a handwriting device, a remote or a voice control device, e.g., a computer, a mobile phone, a PDA, a handheld computer, and a tablet computer. Herein, client device 1 includes an electrical device that computes data and processes information according to a series of preset or stored commands or instructions. The hardware of such electrical device includes, but is not limited to, micro-processors, application-specific integrated circuits (ASIC), field-programmable gate arrays (FPGA), digital signal processors (DSP), embedded devices, and the like.

First apparatus 11 is used for sending a heartbeat request message to the network device. The heartbeat request message includes a present first configuration change code of the client device. Third apparatus 13 is used for obtaining a heartbeat response message sent from the network device in accordance with the first configuration change code. The heartbeat response message includes a present second configuration change code of the network device. Fifth apparatus 15 is used for sending a configuration synchronizing request message in accordance with the first and second configuration change codes. Seventh apparatus 17 is used for obtaining configuration synchronization information sent from the network device to synchronize associated configurations and for updating the first configuration change code according to the results of the configuration synchronization.

Figure 2:
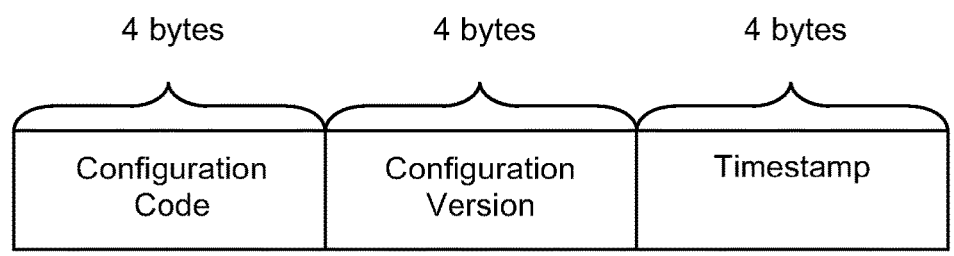
FIG. 2 shows a schematic diagram of either the first or second configuration change code according to an embodiment of the present disclosure.

FIG. 2 shows a schematic diagram of either the first or second configuration change code according to an embodiment of the present disclosure. It can be observed from FIG. 2 that the first and second configuration change codes mainly include three parts: configuration codes (Config_code), configuration versions (Config_version), and timestamps. In an embodiment, each of the three parts is encoded in 4 bytes during programming. The configuration code is a cyclic redundancy code calculated in accordance with a corresponding service name, which marks the service configuration exclusively. The configuration code of the first configuration change code at the client device and the configuration code of the second configuration change code at the network device of the same service are identical. The configuration version is used to identify the updated status of a service; each time the associated configuration of a service is updated, the configuration version of this service is increased accordingly. Therefore, the updated statuses of the services can be monitored by their configuration versions. When the configuration version of the first configuration change code associated with a service is different from the configuration version of the second configuration change code associated with the same service, which means that the updated statuses of the two configuration change codes are different. The lower version of the configuration generally must be updated in order to keep the configuration versions identical of both configuration change codes. The timestamp is mainly used for recording the time at which a service configuration is generated.

In an embodiment of the present disclosure, the first configuration change code and the second configuration change code include configuration codes, configuration versions, and timestamps. To begin, first apparatus 11 sends a heartbeat request message to a network device, wherein the heartbeat request message includes a present first configuration change code of the client device. In an embodiment, this step can be embodied by a series of the following steps.

The heartbeat request message sent by first apparatus 11 includes a first configuration change code. The network device obtains that first configuration change code and searches for a second configuration change code which has a configuration code identical to the configuration code of the first configuration change code, where that second configuration change code reflects or displays present configuration states or situations of the associated services in the network device. Secondly, in accordance with the first configuration change code, third apparatus 13 obtains a heartbeat response message sent from the network device, including a present second configuration change code of the network device. Next, in accordance with the first and second configuration change codes, fifth apparatus 15 sends a configuration synchronizing request message to the network device.

Figure 10:
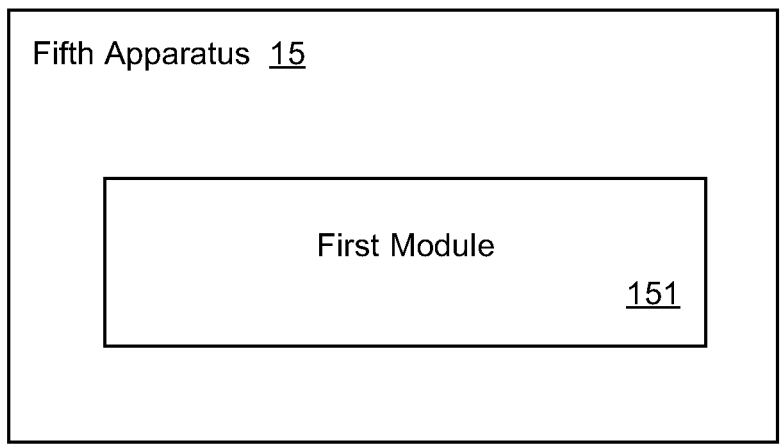
FIG. 10 is a block diagram of a client device for changing configurations in accordance with an embodiment of the present disclosure.

In an embodiment according to the present disclosure, there is a first module 151 incorporated in fifth apparatus 15 (as shown in FIG. 10) used for sending, according to the specific differences between the first configuration change code and the second configuration change code, different configuration synchronizing request messages to the network device. In particular, first module 151 is used for sending a create request to the network device to create a configuration of an associated service when the configuration version of the first configuration change code of the client device is labeled as "uncreated." First module 51 is also used for sending an update request when the configuration version of the second configuration change code is an updated version compared to that of the first configuration change code of the client device, meaning that the second configuration change code is in a more advanced, updated version than the first configuration change code. The update request is sent to the network device to update a configuration of the associated service. First module 151 is also used for sending a delete request for deleting configurations of the associated services to the network when the configuration version of the second configuration change code is labeled as "awaiting to be deleted" or for sending a rebuild request for rebuilding configurations of associated services to the network when the timestamp of the configuration version of the first configuration change code is different from the timestamp of the second configuration change code.

Those skilled in the art will appreciate that fifth apparatus 15 updating configurations according to the differences between the first configuration change code and the second configuration change code is only one of the implementation models of first module 151. Once there are specific settings for all of the variants of the configuration and the specific application scenarios, all of the possible configuration changing situations appear according to the configuration change codes. Moreover, all of the specific implementation models selected when updating the configurations according to the configuration change code can be included within the scope of the present disclosure.

Next, seventh apparatus 17 obtains configuration synchronization information sent from the network device to synchronize configurations of the corresponding services accordingly and updates the first configuration change code according to the results of the configuration synchronization.

Figure 11:
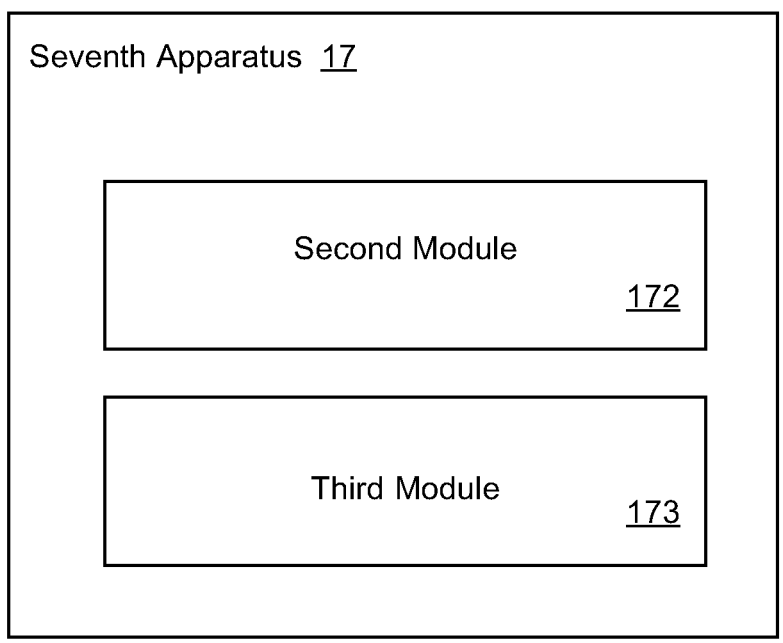
FIG. 11 is a block diagram of a client device for changing configurations in accordance with an embodiment of the present disclosure.

In an embodiment of the present disclosure, second module 172 is incorporated in seventh apparatus 17 (as shown in FIG. 11). Second module 172 is used for obtaining a configuration synchronizing response message, including configuration information of the associated services sent from the network device. The configuration information of the associated services carried by this configuration synchronizing response message may include configuration data of the associated services, etc. Client device 1 can directly update the configurations according to the configuration information of the associated services. The configuration information of the associated services carried by the aforementioned configuration synchronizing response message includes configuration information of the service configuration when the service configuration is created, updated, deleted, or rebuilt.

Additionally, seventh apparatus 17 can also include third module 173 in another embodiment according to the present disclosure (as shown in FIG. 11). Third module 173 is used for updating the first configuration change code after the related configuration is synchronized. In particular, third module 173 is used for generating a configuration version and a timestamp for the first configuration change code after the generation of the service configuration. Third module 173 is also used for updating the configuration version of the first configuration change code after the service configuration is updated. Additionally, after the service configuration is deleted, third module 173 is used for labeling the configuration version of the first configuration change code as "deleted." The third module is also used for updating the timestamp of the first configuration change code after the service configuration is reconstructed.

Moreover, the series of apparatuses incorporated in client device 1 operate constantly in a cooperative manner. First apparatus 11 constantly sends the heartbeat request message, third apparatus 13 constantly obtains the heartbeat response message sent from the network device, and fifth apparatus 15 constantly monitors changes in the first and second configuration change codes; once a change is observed, a configuration synchronizing request message including a selected specific request according to the attribute of the change would be sent to the network device. Seventh apparatus 17 updates associated configurations upon receiving such a configuration synchronizing request message. Herein, those skilled in the art will appreciate that "constantly" means different apparatuses in client device 1 keep sending and receiving the heartbeat request message periodically and the heartbeat response message respectively, conduct required actions, and operate in a cooperative manner.

Compared to existing techniques, the client device used for updating configurations in the embodiment according to the present disclosure uses the heartbeat request message to communicate. The heartbeat request message carries a present first configuration change code of a local service. The client device obtains a present second configuration change code of the network device associated with the same local service as the first configuration change code through the heartbeat request message. The second configuration change code is then sent back to the client device through a heartbeat response message. By distinguishing the differences between the first and second configuration change codes, the information regarding configurations needing to be updated is obtained. Also, information may be obtained by sending a configuration synchronizing request message to the network device to request to synchronize configurations of the associated service and to update the first configuration change code. Most of the client devices possess a mechanism of communicating via heartbeat messages. Therefore, there is no need to add any additional modules requiring maintenance, which further reduces the burdens of the client devices and network devices. Moreover, the network devices no longer need to add additional modules to maintain the clients' statuses, and this advantageously reduces the workload burdens of the servers. Meanwhile, the configuration codes can embed a relatively smaller amount of data to substantially cover all items of the configuration changes, which is beneficial to designing a lightweight cluster system.

Figure 3:
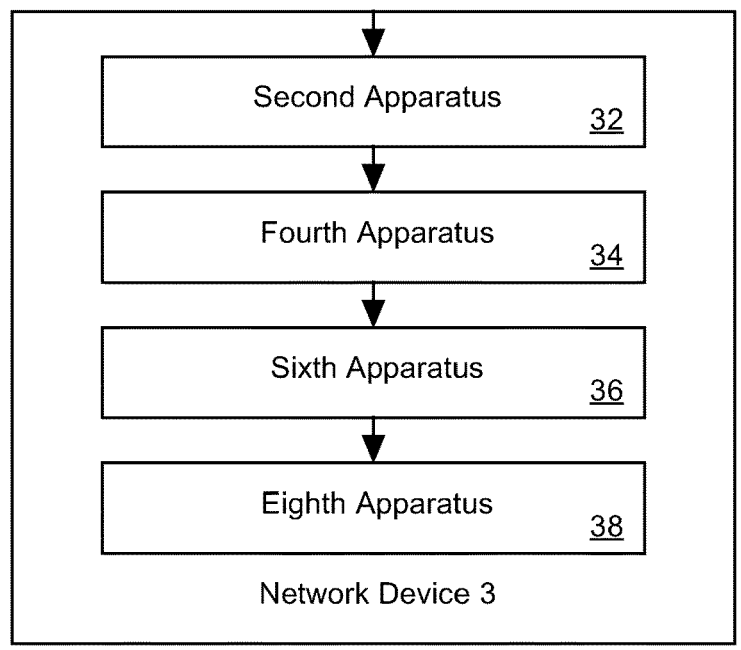
FIG. 3 illustrates a block diagram of a network device for changing configurations according to an embodiment of the present disclosure.

FIG. 3 illustrates a block diagram of a network device for changing configurations according to an embodiment of the present disclosure. Network device 3 includes second apparatus 32, fourth apparatus 34, sixth apparatus 36, and eighth apparatus 38. Second apparatus 32 is used to receive a heartbeat request message from a client device, including a present first configuration change code of the client device. Fourth apparatus 34 is used for searching for, in accordance with the first configuration change code, a present second configuration change code of the network device. In response to the heartbeat request message, sixth apparatus 36 is used for sending a heartbeat response message to the client device, including the second configuration change code. Eighth apparatus 38 is used for obtaining a configuration synchronizing request message requesting to synchronize configurations of associated services and then retuning configuration synchronization information, according to the configuration synchronizing request message, to the client device.

Network device 3 can be embodied by a cloud comprising a network mainframe, a separate network server, a set of multiple network servers, or multiple network servers, for instance. Herein, a cloud is constructed by a large number of mainframes or network servers based on cloud computing. Cloud computing is a type of distributed computing which is also a group of loosely coupled computers constituting a virtual supercomputer. The network device includes an electrical device, which computes data and processes information according to a series of preset or stored commands. The hardware of such electrical device includes, but is not limited to, micro-processors, application-specific integrated circuits (ASIC), field-programmable gate arrays (FPGA), digital signal processors (DSP), embedded devices, and the like.

Referring back to FIG. 2, in one embodiment, the first configuration change code and the second configuration change code mainly include three parts: configuration codes (Config_code), configuration versions (Config_version), and timestamps. The configuration code is the cyclic redundancy code calculated in accordance with a service name having a corresponding configuration, which marks the service configuration exclusively. The configuration codes of the first configuration change code of the client device and the second configuration change code of the network device of the same service are identical. The configuration version is used for identifying the updated status of a service. Each time the associated configuration of a service is updated, the configuration version of this service will be increased accordingly. Therefore, the updated statuses of the services can be monitored by reading their configuration versions. When the configuration version of the first configuration change code associated with a service is different from the configuration version of the second configuration change code associated with the same service, which means that the updated statuses of the two configuration change codes are different. An update of the lower version of the configuration is then required in order to keep the configuration versions of both configuration change codes identical. The timestamp is mainly used for recording the time of the generation of a service configuration.

Figure 12:
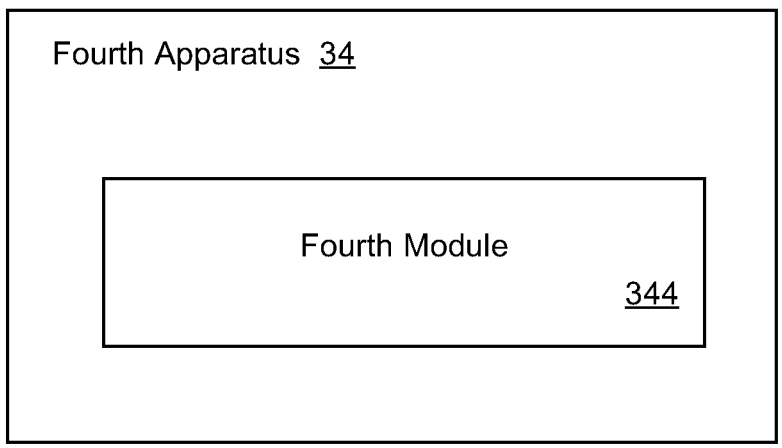
FIG. 12 is a block diagram of a network device for changing configurations in accordance with an embodiment of the present disclosure.

In one embodiment of the present disclosure, as related to network device 3, the first and the second configuration change codes mainly include configuration codes, configuration versions, and timestamps. Fourth apparatus 34 in network device 3 includes fourth module 344 (as shown in FIG. 12) that obtains a present second configuration change code of the network device having an identical configuration code to that of the present first configuration change code of the client device.

In an embodiment, the configuration synchronization information includes the configuration synchronizing response message that carries configuration information of associated services.

Since the mechanism of using heartbeat messages to communicate requires constantly running hardware and/or software, second apparatus 32 in network device 3 constantly obtains the heartbeat request message sent from the client device. The other apparatuses in network device 3 constantly send relevant information according to the heartbeat request messages and the subsequent configuration synchronizing request message. Therefore, the client device can obtain the most updated configuration synchronization information of associated services in a timely manner.

Figure 4:
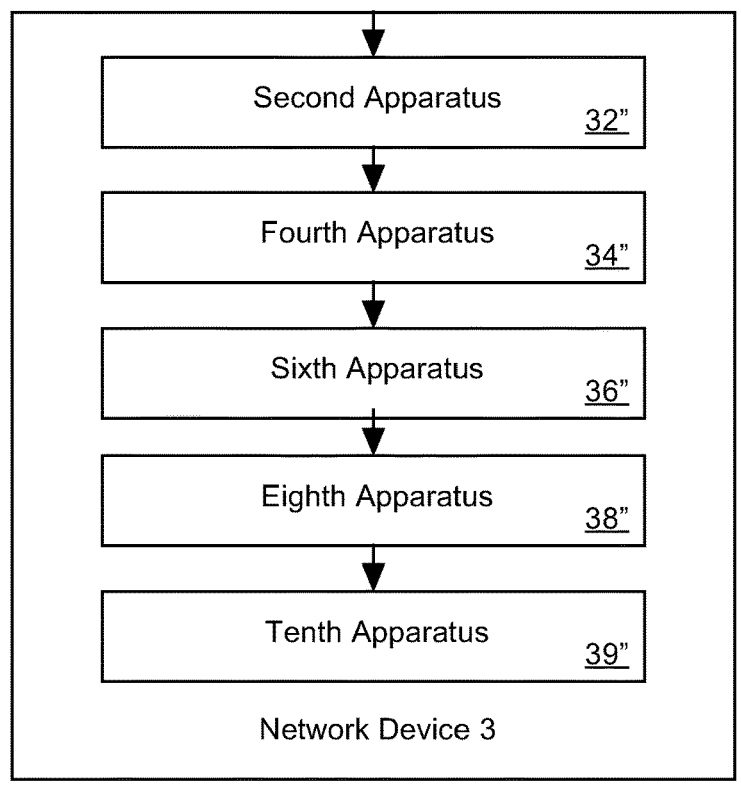
FIG. 4 illustrates a block diagram of a network device according to the present disclosure.

FIG. 4 illustrates a block diagram of a network device according to the present disclosure. Network device 3 includes second apparatus 32", fourth apparatus 34", sixth apparatus 36", eighth apparatus 38", and tenth apparatus 39". The functions and purposes of second apparatus 32", fourth apparatus 34", sixth apparatus 36", and eighth apparatus 38" are substantially similar to those of second apparatus 32, fourth apparatus 34, sixth apparatus 36, and eighth apparatus 38 in the network device described in FIG. 3, referenced in the foregoing, which do not need to be described in detail herein.

Tenth apparatus 39" in FIG. 4 is used for synchronizing the associated services at the network device when the configuration version of the first configuration change code is greater than the configuration version of the present second configuration change code of the network device. More specifically, this can occur when the first configuration change code is more advanced in update version or has a later update version compared to the second configuration change code of the network device. In other words, when the first configuration change code has a more advanced update or a later update in comparison to the second configuration change code of the network device, the tenth apparatus can be used for synchronizing the associated services at the network device. Network device 3 not only can cooperate with the client device to implement the updates of the configurations of the client device, but also can implement the updates of the configurations of the network device itself with the assistance of the client device by setting up tenth apparatus 39".

If, due to certain special reasons, there is a reconfiguration in one of a group of network devices providing services and the timestamp of the first configuration change code shows an earlier time than the timestamp of the second configuration change code of the network device at the time when the client device is sending a first configuration change code to the network device, then the network device first sends a heartbeat response message which includes a present second configuration change code and is sent to the client device. And then the network device conducts a configuration synchronization of associated services on the network device on itself (as needed). The configuration synchronization of the associated services includes, but is not limited to, sending configuration synchronizing requests to the management systems of several network devices and updating the second configuration change code of each of the network devices respectively. However, the corresponding client devices can choose not to update the configurations if they find that the timestamp of the present first configuration change code of the client device shows an earlier time than the obtained timestamp of the present second configuration change code of the network device after comparing the second configuration change code with the present first configuration change code.

Figure 5:
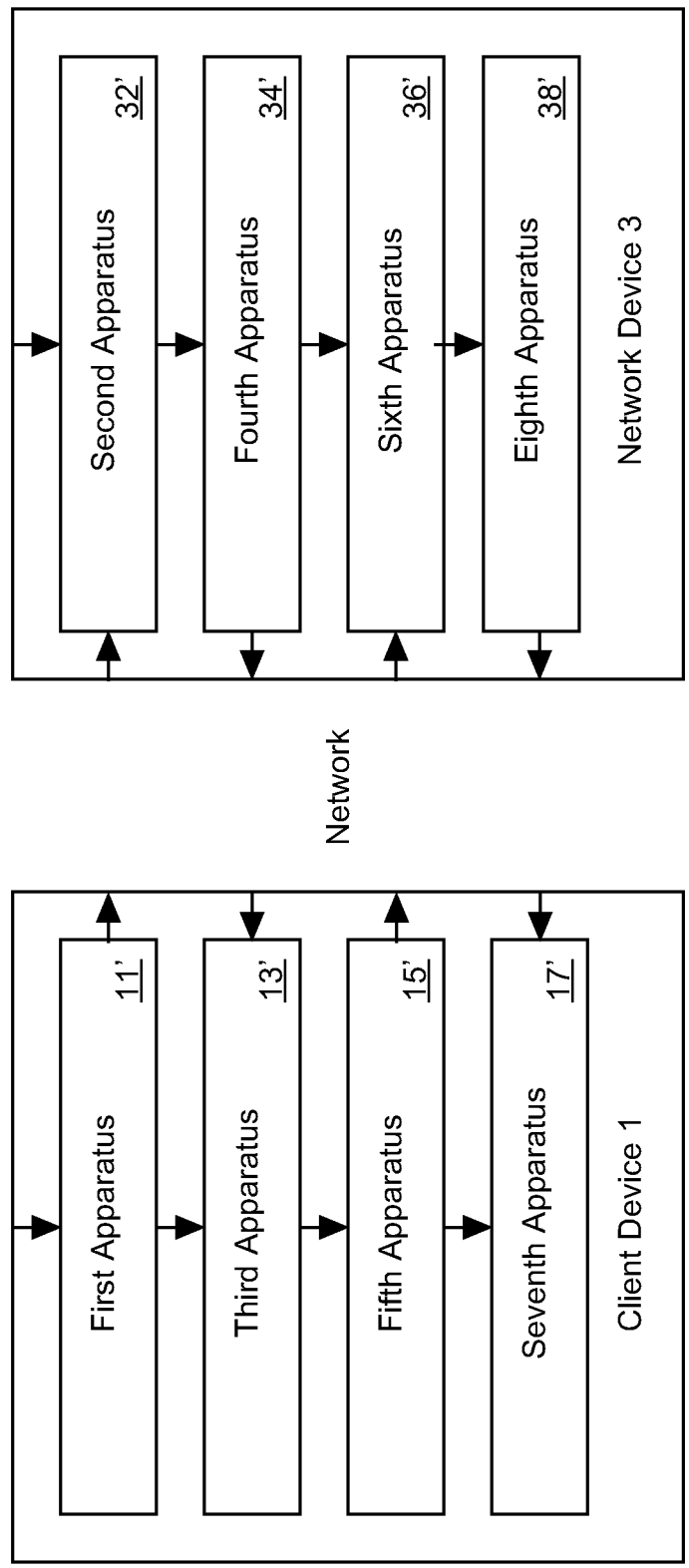
FIG. 5 illustrates a block diagram of a system integrating a client device and a network device according to an embodiment of the present disclosure.

FIG. 5 illustrates a block diagram of a system integrating a client device and a network device according to an embodiment of the present disclosure. The system includes client device 1 and network device 3, where client device 1 includes first apparatus 11", third apparatus 13", fifth apparatus 15", and seventh apparatus 17"; the network device 3 includes second apparatus 32", fourth apparatus 34", sixth apparatus 36", and eighth apparatus 38".

First apparatus 11", third apparatus 13", fifth apparatus 15", and seventh apparatus 17" have substantially similar functions as first apparatus 11, third apparatus 13, fifth apparatus 15, and seventh apparatus 17, respectively, as described in FIG. 1. Second apparatus 32", fourth apparatus 34", sixth apparatus 36", and eighth apparatus 38" have substantially similar functions as second apparatus 32, fourth apparatus 34, sixth apparatus 36, and eighth apparatus 38 of network device 3 respectively, as described in FIG. 3, which can be cross-referenced and are not going to be described in detail herein.

Figure 6:
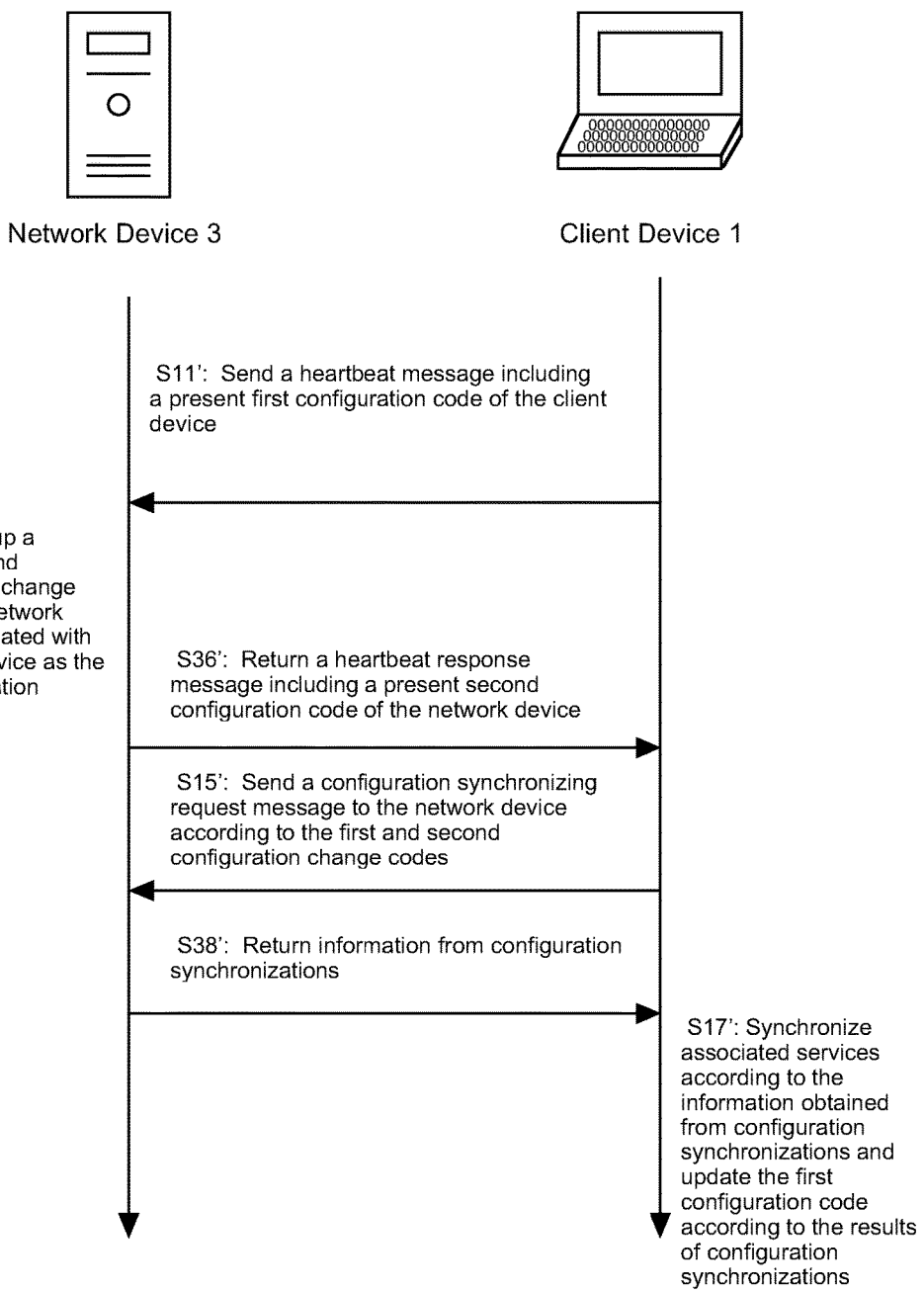
FIG. 6 illustrates a flowchart of an exemplary method for changing configurations, where a client device and a network device cooperate with each other according to an embodiment of the present disclosure.

FIG. 6 illustrates a flowchart of an exemplary method for changing configurations, where a client device and a network device cooperate with each other according to an embodiment of the present disclosure. In Step S11', client device 1 sends a heartbeat request message, including a present first configuration change code of the client device. In Step S34", network device 3 searches for, in accordance with the first configuration change code, a present second configuration code of the network device associated with a relevant service. In Step S36", network device 3 sends a heartbeat response message including a present second configuration change code of the network device. In Step S15", client device 1 sends a configuration synchronizing request message to the network device according to the first and second configuration change codes. In Step S38", network device 3 sends the configuration synchronization information back to client device 1. Finally, in Step S17", client device 1 synchronizes configurations of corresponding services and updates the first configuration change code according to the results of the configuration synchronizing; thus, the configuration update of client device 1 is complete.

Compared to existing techniques, the system integrating the client device and the network device in accordance with embodiments of the present invention embodies a method of changing configurations using the mechanism of communicating through heartbeat messages. The system uses heartbeat messages repeatedly and sends the notifications of changing configurations by embedding associated configuration change codes in the heartbeat messages. The present disclosure is suitable for systems originally having the mechanism of communicating through heartbeat messages to reduce long connections and data transmissions in wireless applications.

Figure 7:
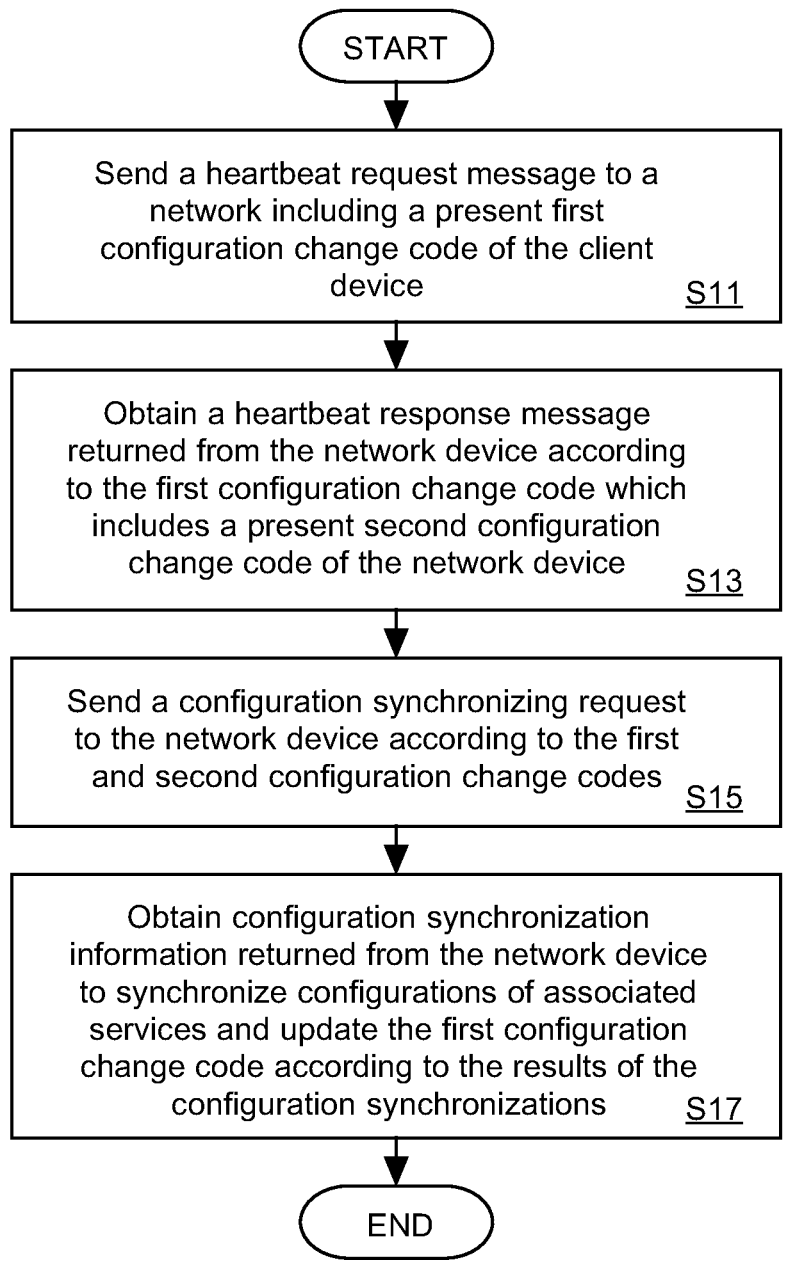
FIG. 7 shows an exemplary method for changing configurations at the client device according to an embodiment of the present disclosure.

FIG. 7 shows a method for changing configurations at the client device according to an embodiment of the present disclosure. The method includes Step S11, Step S13, Step S15, and Step S17. In Step S11, the client device sends a heartbeat request message to a network device, including a present first configuration change code of the network device. In Step S13, the client device obtains a heartbeat response message sent from the network device according to the first configuration change code. The heartbeat response message includes a present second configuration change code of the network device. In Step S15, the client device sends a configuration synchronizing request message to the network device according to the first and second configuration change codes. In Step S17, the client device obtains configuration synchronization information sent from the network device to synchronize configurations of associated services and to update the first configuration change code according to the results of the configuration synchronizations.

Referring back to FIG. 2, in one embodiment, the first and the second configuration change codes mainly include three parts: configuration codes (Config_code), configuration versions (Config_version), and timestamps. In an embodiment, each of the three parts is encoded in 4 bytes. The configuration code is a cyclic redundancy code calculated in accordance with a service name having a corresponding configuration that marks the service configuration exclusively. The first configuration change code of the client device and the second configuration change code of the network device of the same service are identical. The configuration version is used for identifying the updated status of a service. Each time the associated configuration of a service is updated, the configuration version of this service will be increased accordingly. Therefore, the updated statuses of the services can be monitored by their configuration versions. When the configuration version of the first configuration change code associated with a service is different from the configuration version of the second configuration change code associated with the same service, that means that the updated statuses of the two configuration change codes are different and an update of the lower version of the configuration is required in order to keep identical the configuration versions of both configuration change codes. The timestamp is mainly used for recording the time of the generation of a service configuration.

Given that the first configuration change code and the second configuration change code mainly include configuration codes, configuration versions, and timestamps, an embodiment of the method for changing configurations related to FIG. 7 is further described in detail hereinafter.

In Step S11, the client sends a heartbeat request message to a network device, including a present first configuration change code of the client device. In an embodiment, the heartbeat request message sent in Step S11 includes a first configuration change code; after the network device obtains the first configuration change code, the network device searches for a second configuration change code having an identical configuration code to the configuration code of the first configuration change code where the second configuration change code reflects or reveals the present configuration states and situations of the associated services in the network device.

In Step S13, the client device obtains a heartbeat response message sent from the network device according to the first configuration change code. The heartbeat response message includes a present second configuration change code of the network device.

In Step S15, the client device sends a configuration synchronizing request message to the network device according to the first and second configuration change codes. In an embodiment of the present disclosure, Step S15 further includes the following: sending, according to the specific differences between the first configuration change code and the second configuration change code, different configuration synchronizing request messages to the network device. In particular, when the configuration version of the first configuration change code of the client device is labeled as "uncreated," the client device would send a create request to the network device to create a configuration of an associated service. Alternatively, when the configuration version of the second configuration change code is a more updated version compared to that of the first configuration change code of the client device (meaning that the second configuration change code is a more advanced, updated version than the first configuration change code) an update request would be sent to the network device to update a configuration of the associated service. Step S15 also includes sending a delete request to delete configurations of the associated services to the network when the configuration version of the second configuration change code is labeled as "awaiting to be deleted" or sending a rebuild request to rebuild configurations of associated services to the network when the timestamp of the configuration version of the first configuration change code is different from the timestamp of the second configuration change code.

Those skilled in the art will understand that fifth apparatus 15 updating configurations according to the differences between the first and the second configuration change codes is only one of the implementation models of the first module. Once there are specific settings for all of the variants of the configuration and the specific application scenarios, the possible configuration changing situations appear according to the configuration change codes and the specific ways selected when updating the configurations according to the configuration change code would all be included in the scope of the present disclosure.

In Step S17, the client device obtains configuration synchronization information returned from the network device to synchronize configurations of associated services and to update the first configuration change code according to the results of the configuration synchronization. In an embodiment, Step S17 includes obtaining a configuration synchronizing response message including configuration information of associated services. The configuration information of an associated service carried by the configuration synchronizing response message can include configuration data of associated services, which enables the client device to directly update the configuration according to such configuration information. The configuration information of the associated service carried by the configuration synchronizing response message includes configuration information of the service configuration when it is created, updated, deleted, or reconstructed or rebuilt.

Additionally, another step is also included in Step S17, which involves updating the first configuration change code after the synchronization of the configurations. A configuration version and a timestamp of the first configuration change code are generated after the generation of the service configuration. The configuration version of the first configuration change code is updated after the service configuration is updated, the configuration version of the first configuration change code will be labeled as "deleted" after the service configuration is deleted, or the timestamp of the first configuration change code is updated after the service configuration is reconstructed.

The steps of the method are operated constantly in a cooperative manner. In particular, in Step S11, a heartbeat request message is sent out constantly. In Step S13, a heartbeat response message sent from the network device in response to heartbeat request message is obtained constantly. In Step S15, changes in the first and the second configuration change codes are constantly monitored. Once a change is observed, a configuration synchronizing request message including a selected specific request according to the attribute of the change would be sent to the network device. In Step S17, associated configurations upon receiving such configuration synchronizing request messages are updated. Herein, those skilled in the art will understand that "constantly" may be interpreted differently in different steps of the method, but generally means a mechanism of regularly sending and receiving the heartbeat request message and the heartbeat response message respectively, conducting required actions, and overall working in a cooperative manner.

Compared to existing techniques, the method used for updating a configuration in the embodiment of the present disclosure uses the heartbeat request message to communicate. The heartbeat request message carries a present first configuration change code of a local service. The client device obtains a present second configuration change code of the network device associated with the same local service as the first configuration change code through the heartbeat request message; the second configuration change code is then sent back to the client device by a heartbeat response message. By distinguishing the differences between the first and the second configuration change codes, the configuration information needing to be updated is obtained. By sending a configuration synchronizing request message to the network device, configurations of the associated service will be synchronized and the first configuration change code will be updated. Most of the client devices possess the mechanism of communicating via heartbeat messages; therefore, there is no need to add any additional modules requiring maintenances, which further reduces the workload burdens of the client devices and network devices. Moreover, the network devices no longer need to add additional modules to maintain the clients' statuses, which reduces the burdens of the servers. Meanwhile, the configuration codes can embed a relatively smaller amount of data to substantially cover all of the items in the configuration changes, and this attribute is beneficial to designing a lightweight cluster system.

Figure 8:
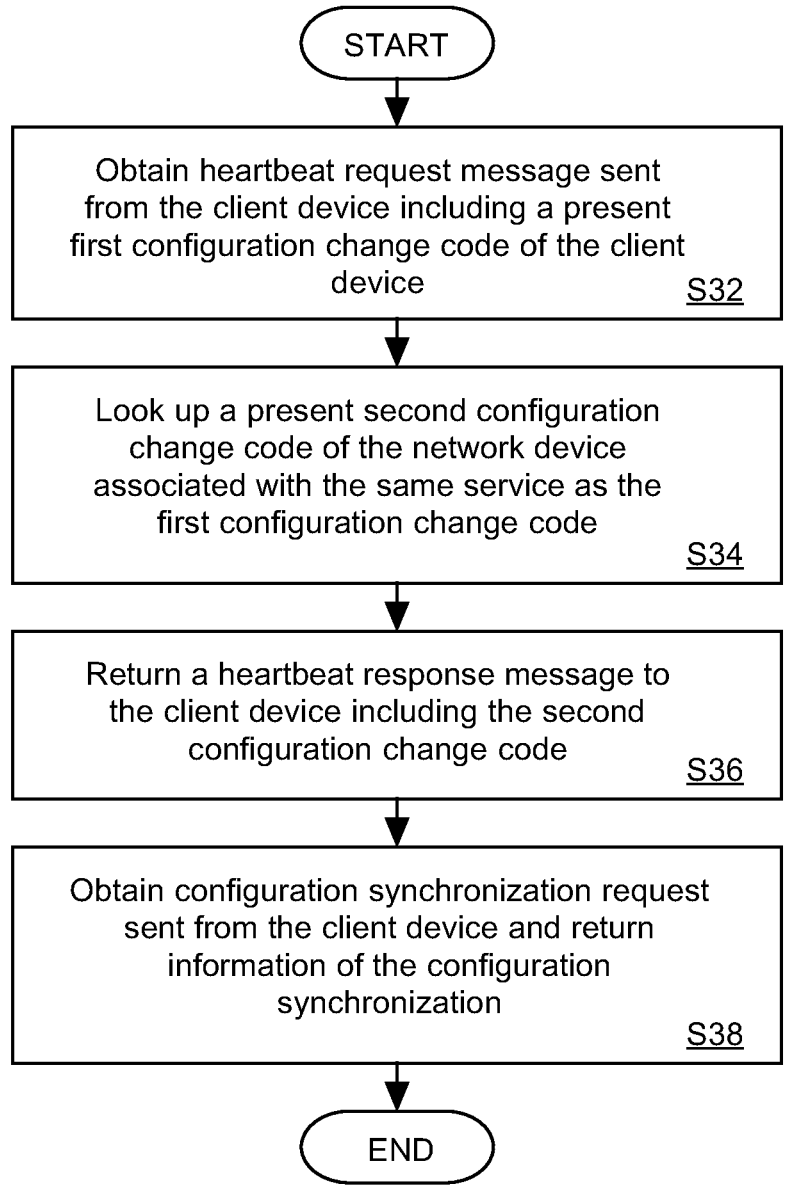
FIG. 8 shows a flowchart of an exemplary method for changing configurations at the network device according to an embodiment of the present disclosure.

FIG. 8 shows a flowchart of an exemplary method for changing configurations at the network device according to an embodiment of the present disclosure. The method includes Step S32, Step S34, Step S36, and Step S38. In Step S32, a network device obtains a heartbeat request message sent from a client device, including a present first configuration change code of the client device. In Step S34, the network device searches for a present second configuration change code of the network device associated with relevant services according to the first configuration change code. In Step S36, the network device sends a heartbeat response message to the client device, including the second configuration change code. In Step S38, the network device sends configuration synchronization information according to a configuration synchronizing request message sent from the client device.

Referring to FIG. 2, in one embodiment according to the present disclosure, the first and the second configuration change codes mainly include three parts: configuration codes (Config_code), configuration versions (Config_version), and timestamps. The configuration code is the cyclic redundancy code calculated in accordance with a service name having a corresponding configuration, which marks the service configuration exclusively. The first configuration change code at the client device and the second configuration change code at the network device of the same service are identical. The configuration version is used for identifying the updated status of a service. Each time the associated configuration of a service is updated, the configuration version of this service will be increased accordingly. Therefore, the updated statuses of the services can be monitored by reading their configuration versions. When the configuration version of the first configuration change code associated with a service is different from the configuration version of the second configuration change code associated with the same service, that means that the updated statuses of the two configuration change codes are different, and an update of the lower version of the configuration is required in order to keep the configuration versions of both configuration change codes identical. The timestamp is mainly used for recording the time of the generation of a service configuration.

Given that the first and the second configuration change codes include configuration codes, configuration versions, and timestamps, the method can be further described as follows. Step S34 further includes obtaining a present second configuration change code of the network device having the same configuration code as the configuration code of the first configuration change code.

In an embodiment, the configuration synchronization information includes a configuration synchronizing response message including configuration information of the associated service.

Since the mechanism of communicating through heartbeat messages requires a process that works constantly, in Step S32 of the method for changing configurations of a network device, the network device constantly obtains heartbeat request messages sent from the client device. And the other steps also constantly send required information according to the heartbeat request message and other related messages. Therefore, the client device can receive the more updated configuration synchronization information in a timely manner.

Figure 9:
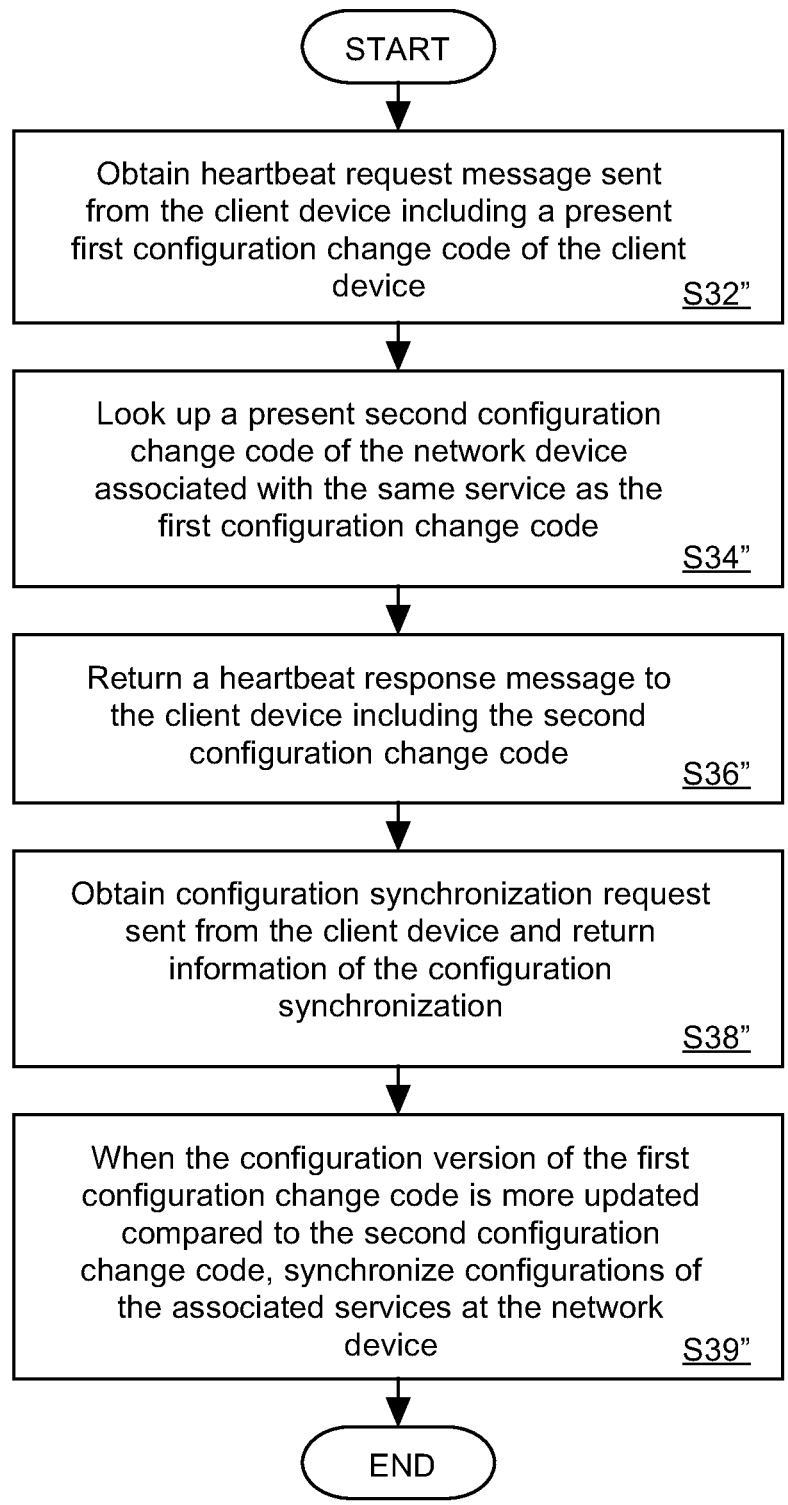
FIG. 9 illustrates another exemplary method for changing configurations at the network device according to an embodiment of the present disclosure.

FIG. 9 illustrates another exemplary method for changing configurations at the network device according to an embodiment of the present disclosure. The method includes Step S32", Step S34", Step S36", Step S38", and Step S39". Step S32", Step S34", Step S36", and Step S38" have substantially similar functions to Step S32, Step S34, Step S36, and Step S38 described in FIG. 7, which can be cross-referenced and are not discussed in detail herein.

In Step S39", when the configuration version of the first configuration change code is more updated compared to the second configuration change code, the configurations of the associated services will be updated at the network device. The method for changing configurations at the network device not only can cooperate with the client device to implement the update of the configurations of the client device, but also can implement the update of the network device with assistance from the client device.

In particular, if there is reconfiguration of one of a group of network devices providing services due to certain special reasons and the timestamp of the first configuration change code shows an earlier time than the timestamp of the second configuration change code of the network device at the time when the client device sends a first configuration change code to the network device, the network device sends a heartbeat response message including a present second configuration change code to the client device first and then conducts a configuration synchronization of associated services on the network device itself. The configuration synchronization of the associated services include, but are not limited to, sending configuration synchronizing requests to the management systems of several network devices and updating the second configuration change codes of the network devices respectively. However, the corresponding client devices can choose not to update the configurations if they find that the timestamp of the present first configuration change code of the client device shows an earlier time than the obtained timestamp of the present second configuration change code of the network device after comparing the second configuration change code obtained with the present first configuration change code.

Those skilled in the art will appreciate that the descriptions about the first and second configuration change codes are just preferred examples. In other embodiments, the changing of the configurations can be set according to all of the variants of a certain configuration change code or the specific application scenarios; therefore, the possible data-transmitting formats that can be considered as configuration change codes and that can embody the change in configurations which may appear in the future can all be included in the scope of the present disclosure.

It should be noted that the present disclosure can be embodied in a combination of hardware and software. For example, an application-specific integrated circuit, a general purpose computer, or any other similar hardware device can be adopted to embody the embodiments described in the foregoing according to the present disclosure. In certain embodiments, the software of the present disclosure can be embodied by a processor executing the steps of the functions in the foregoing. The software of the present disclosure, including related data structures, can also be stored in computer-readable mediums, e.g., a RAM, a magnetic disk, a CD or a soft disc, and similar devices. Moreover, certain steps of the present disclosure can also be embodied in certain hardware, e.g., a circuit cooperating with a processor to execute each of the steps or functions.

Additionally, part of the present disclosure can be applied as a computer-programmable product. For example, a computer program command can be one of such computer-programmable products that, when executed by a computer, allocates or provides the methods or devices described in the present disclosure through the operation of the computer. The commands to allocate any of the methods of the present disclosure may be stored in fixed or portable recording mediums, and/or transmitted through dataflow in broadcast or other signal carrying medias, and/or stored in working memory of the computer operating according to the commands. According to a device included in an embodiment of the present disclosure, the device includes a storage that stores computer program commands and a processor that executes program commands; when the computer program commands are executed by the processor, this device would be triggered to execute multiple methods and/or devices according to embodiments of the present disclosure.

It is also necessary to point out that, in the Claims and Specification of the present disclosure, terms such as "first" and "second" only are for distinguishing an embodiment or an operation from another embodiment or operation. It does not require or imply that those embodiments or operations have any such real relationship or order. Further, as used herein, the terms "comprising," "including," or any other variation intended to cover a non-exclusive inclusion such that a process, method, article, or apparatus that comprises a list of elements does not include only those elements but may include other elements not expressly listed or inherent to such process, method, article, or apparatus. Absent further limitation, elements recited by the phrase "comprising a" do not exclude a process, method, article, or apparatus that comprises such elements from including other same elements.

Embodiments according to the present disclosure are thus described. While the present disclosure has been described in terms of particular embodiments, it should be appreciated that the disclosure should not be construed as to be limited by such embodiments, but rather construed according to the below claims.

What is claimed is:

1. A method of changing configurations at a client device, wherein the method comprises:
    sending a heartbeat request message to a network device, wherein the heartbeat request message carries a current first configuration change code of a client device;
    receiving from the network device a heartbeat response message in accordance with the first configuration change code, wherein the heartbeat response message comprises a current second configuration change code of the network device;
    sending, in accordance with the first configuration change code and the second configuration change code, a request message to the network device for synchronizing configurations;
    obtaining configuration synchronization information from the network device;
    synchronizing configurations of associated services according to the configuration synchronization information; and
    updating the first configuration change code in accordance with results of the configuration synchronization.

2. The method of claim 1, wherein a configuration code of the current second configuration change code of the network device carried by the heartbeat response message is the same as a configuration code of the first configuration change code.

3. The method of claim 1, wherein the sending the request message for synchronizing configurations to the network device in accordance with the first configuration change code and the second configuration change code comprises one of the following operations:
    a) sending a request to create a configuration for an associated service to the network device when a configuration version of the first configuration change code of the client device is labeled as uncreated;
    b) sending a request to update a configuration of the associated service to the network device when a configuration version of the second configuration change code is labeled as updated in comparison to a configuration version of the first configuration change code of the client device;
    c) sending a delete request when a configuration version of the second configuration change code is labeled as ready to be deleted; and
    d) sending a request to rebuild a configuration of the associated service to the network device when a timestamp of a configuration version of the first configuration change code of the client device is different from the timestamp of the second configuration change code.

4. The method according to claim 1, wherein the obtaining the configuration synchronization information sent from the network device further comprises:
    obtaining a configuration synchronization response message responding to a configuration synchronization request message sent from the network device, wherein the configuration synchronization response message comprises configuration information of an associated service.

5. The method of claim 4, wherein the configuration information of the associated service carried by the response message comprises information of one or more of the following:
    a) configuration information of a service configuration's creation;
    b) configuration information of the service configuration's update;
    c) configuration information of the service configuration's deletion; and
    d) configuration information of the service configuration's reconstruction.

6. The method of claim 5, wherein the updating the first configuration change code in accordance with results of the configuration synchronization comprises one or more of the following operations:
    a) generating a configuration version and a timestamp of the first configuration change code after the service configuration's creation;
    b) updating the configuration version of the first configuration change code after the service configuration's update;
    c) labeling the configuration version of the first configuration change code as deleted after the service configuration's deletion; and
    d) updating the timestamp of the first configuration change code after the service configuration's reconstruction.

7. The method according to claim 2, wherein configuration codes of the first configuration change code and the second configuration change code comprise a cyclic redundancy code obtained in accordance with a service name of an associated configuration.

8. The method according to claim 3, wherein configuration versions of the first configuration change code and the second configuration change code comprise version information of associated service configurations.

9. The method according to claim 8, wherein timestamps of the first configuration change code and the second configuration change code comprise generation time of associated service configurations.

10. A method of changing configurations of a network device side, the method comprising:
    obtaining a heartbeat request message sent from a client device, wherein the heartbeat request message carries a current first configuration change code of the client device;
    searching for a current second configuration change code of a network device associated with an associated service in accordance with the first configuration code;
    sending to the client device a heartbeat response message, wherein the heartbeat response message comprises the second configuration change code of the network device; and
    obtaining a configuration synchronizing request message sent from the client device and then sending, in accordance with the configuration synchronizing request message, configuration synchronization information.

11. The method of claim 10, further comprising, after the heartbeat response message is returned to the client device, synchronizing a configuration of the associated service at the network device, wherein a configuration version of the current first configuration change code is greater than a configuration version of the current second configuration change code of the network device.

12. The method of claim 11, wherein the searching for the current second configuration change code of the network device associated with the associated service in accordance with the first configuration code further comprises:
obtaining, in accordance with a configuration code of the current first configuration change code of the client device, the current second configuration change code of the network device having a configuration code identical to the configuration code of the current first configuration change code.

13. The method of claim 10, wherein the configuration synchronization information further comprises:
a configuration synchronizing response message, wherein the configuration synchronizing response message carries configuration information of the associated service.

14. The method of claim 10, wherein configuration codes of the first configuration change code and the second configuration change code comprise a cyclic redundancy code obtained in accordance with a service name of an associated service configuration, and wherein configuration versions of the configuration codes of the first configuration change code and the second configuration change code comprise version information of the associated service configuration, and wherein timestamps of the configuration codes of the first configuration change code and the second configuration change code comprise generation time of the associated service configuration.

15. A client device for changing configurations, the client device comprising:
a heartbeat sending computer configured for sending a heartbeat request message to a network device, wherein the heartbeat request message carries a current first configuration change code of the client device;
a heartbeat receiving computer configured for obtaining a heartbeat response message sent from the network device in accordance with the first configuration change code, wherein the heartbeat response message comprises a current second configuration change code;
first configuration synchronizing computer configured for sending a configuration synchronizing request message to the network device in accordance with the first configuration change code and the second configuration change code; and
second configuration synchronizing computer configured for obtaining configuration synchronization information sent from the network device to synchronize a configuration of an associated service and further configured for updating the first configuration change code in accordance with results of the configuration synchronization information.

16. The client device of claim 15, wherein a configuration code of the current second configuration change code of the network device carried by the heartbeat response message is identical to a configuration code of the first configuration change code.

17. The client device of claim 15, wherein the first configuration synchronizing computer is further configured for performing one or more of the following operations:
a) sending a request to create a configuration for the associated service to the network device when a configuration version of the first configuration change code of the client device is marked as uncreated;
b) sending a request to update a configuration for the associated service to the network device when a configuration version of the second configuration change code is marked as updated in comparison to the configuration version of the first configuration change code of the client device;
c) sending a request to delete a configuration of the associated service to the network device when a configuration version of the second configuration change code is marked for deletion; and
d) sending a request to reconstruct a configuration of the associated service to the network device when a timestamp of the configuration version of the first configuration change code of the client device is different from the timestamp of the second configuration change code.

18. The client device of claim 15, wherein the second configuration synchronizing computer is further configured for obtaining a configuration synchronizing response message sent from the network device, wherein the configuration synchronizing response message comprises configuration information of the associated service.

19. The client device of claim 18, wherein the configuration information of the associated service carried by the configuration synchronizing response message comprises information of one or more of the following:
a) configuration information of a service configuration's creation,
b) configuration information of the service configuration's update,
c) configuration information of the service configuration's deletion, and
d) configuration information of the service configuration's reconstruction.

20. The client device of claim 19, wherein the second configuration synchronizing computer is further configured for one of the following operations:
a) generating a configuration version and a timestamp of the first configuration change code after the service configuration's creation;
b) updating the configuration version of the first configuration change code after the service configuration's update;
c) labeling the configuration version of the first configuration change code as deleted after the service configuration's deletion; and
d) updating the timestamp of the first configuration change code after the service configuration's reconstruction.

* * * * *